United States Patent
Lee et al.

(10) Patent No.: US 12,420,858 B2
(45) Date of Patent: Sep. 23, 2025

(54) STEERING DEVICE FOR VEHICLE

(71) Applicant: HYUNDAI MOBIS CO., LTD., Seoul (KR)

(72) Inventors: Suk Won Lee, Yongin-si (KR); Kwang Yoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 874 days.

(21) Appl. No.: 17/653,619

(22) Filed: Mar. 4, 2022

(65) Prior Publication Data
US 2022/0281513 A1 Sep. 8, 2022

(30) Foreign Application Priority Data
Mar. 8, 2021 (KR) .................. 10-2021-0030379

(51) Int. Cl.
  *B62D 5/04* (2006.01)
  *B62D 15/02* (2006.01)
(52) U.S. Cl.
  CPC ......... *B62D 5/0403* (2013.01); *B62D 5/0454* (2013.01); *B62D 15/0225* (2013.01)
(58) Field of Classification Search
  CPC .. B62D 15/021; B62D 15/0225; B62D 5/001; B62D 3/12
  See application file for complete search history.

(56) References Cited

U.S. PATENT DOCUMENTS

| | | | | |
|---|---|---|---|---|
| 4,008,627 A | * | 2/1977 | Bradshaw | B62D 3/12 74/498 |
| 2019/0256142 A1 | * | 8/2019 | Chae | B62D 15/0225 |
| 2021/0221427 A1 | * | 7/2021 | Span | B62D 5/001 |

FOREIGN PATENT DOCUMENTS

| | | | | |
|---|---|---|---|---|
| KR | 10-2008-0004177 | | 1/2008 | |
| KR | 20190094934 A | * | 8/2019 | B62D 6/002 |

OTHER PUBLICATIONS

Translation of KR-20190094934-A (Year: 2019).*

* cited by examiner

*Primary Examiner* — Christopher B Wehrly
(74) *Attorney, Agent, or Firm* — DLA PIPER LLP US (57) ABSTRACT

A steering device for a vehicle, the steering device including: a rack housing unit; a rack drive unit inserted into the rack housing unit and configured to be movable in an axial direction; a casing unit coupled to the rack housing unit; a rotary unit mounted in the casing unit and configured to engage with the rack drive unit and be rotatable; and a detection unit mounted on the casing unit and configured to measure a rotation of the rotary unit, thereby implementing a degree of shape freedom and simplifying an assembly structure.

10 Claims, 8 Drawing Sheets

STEERING DEVICE FOR VEHICLE

CROSS-REFERENCE TO RELATED APPLICATION

This application claims priority from and the benefit of Korean Patent Application No. 10-2021-0030379, filed on Mar. 8, 2021, which is hereby incorporated by reference for all purposes as if set forth herein.

BACKGROUND

Field

Exemplary embodiments of the present disclosure relate to a steering device for a vehicle, and more particularly, to a steering device for a vehicle, which is capable of implementing a degree of shape freedom by injection molding and simplifying an assembly structure.

Discussion of the Background

In general, an electric steering device includes a steering system connected to a steering wheel and two wheels, and an auxiliary power train configured to supply auxiliary steering power to the steering system.

The steering system includes a steering shaft having an upper end connected to the steering wheel and a lower end connected to a pinion shaft by means of a pair of universal joints, and the steering shaft rotates together with the steering wheel. In addition, the pinion shaft is connected to a rack bar by means of a rack-pinion mechanism, and two opposite ends of the rack bar are connected to the wheels by means of tie rods and knuckle arms.

The rack-pinion mechanism includes a pinion gear disposed at a lower end of the pinion shaft, and a rack gear disposed at one side of an outer peripheral surface of the rack bar, and the pinion gear and the rack gear engage with each other. The rack-pinion mechanism converts a rotational motion of the pinion shaft into a rectilinear motion of the rack bar. Therefore, when a driver manipulates the steering wheel, the pinion shaft rotates, the rack bar rectilinearly moves in an axial direction according to the rotation of the pinion shaft, and the rectilinear motion of the rack bar steers the wheels through the tie rods and the knuckle arms.

Meanwhile, the auxiliary power train includes: a torque sensor configured to detect steering torque, which is applied to the steering wheel by the driver, and output an electrical signal proportional to the detected steering torque; an electronic control device configured to generate a control signal on the basis of the electrical signal transmitted from the torque sensor; and a motor configured to generate auxiliary steering power on the basis of the control signal transmitted from the electronic control device.

Therefore, the electric steering device is configured such that the steering torque, which is generated by the rotation of the steering wheel, is transmitted to the rack bar via the rack-pinion mechanism, and the auxiliary steering power, which is generated by the motor on the basis of the generated steering torque, is transmitted to the steering shaft, the pinion shaft, or the rack bar. That is, the rack bar is moved in the axial direction by a combination of the steering torque generated by the steering system and the auxiliary steering power generated by the motor.

However, the electric steering device in the related art has problems in that the steering shaft for steering input needs to mechanically connect the steering wheel and the pinion shaft, which complicates the structure, and moisture flows into a connection part, which causes a mechanical defect. Therefore, there is a need to solve the problems.

The background technology of the present disclosure is disclosed in Korean Patent Application Laid-Open No. 2008-0004177 (published on Jan. 9, 2008 and entitled 'Steer-by-Wire Steering Device for Vehicle').

SUMMARY

Various embodiments are directed to a steering device for a vehicle, which is capable of implementing a degree of shape freedom by injection molding and simplifying an assembly structure.

In an embodiment, a steering device for a vehicle includes: a rack housing unit; a rack drive unit inserted into the rack housing unit and configured to be movable in an axial direction; a casing unit coupled to the rack housing unit; a rotary unit mounted in the casing unit and configured to engage with the rack drive unit and be rotatable; and a detection unit mounted on the casing unit and configured to measure a rotation of the rotary unit.

One or more of the rack housing unit, the casing unit, and the detection unit may be manufactured by injection molding.

The rack housing unit may include: a rack housing body part penetrated by the rack drive unit; a rack housing hole part formed in the rack housing body part and configured to guide insertion of the rotary unit; and a rack housing contact part formed in the rack housing body part, disposed along a periphery of the rack housing hole part, and being in close contact with the casing unit.

The rack housing unit may further include a rack housing sealing part disposed between the rack housing body part and the casing unit and configured to prevent an inflow of foreign substances.

The casing unit may include: a cylindrical part having a shape having an opening at one side thereof and configured to expose the rotary unit; a lower support part configured to cover a lower end of the cylindrical part and support the rotary unit; an upper support part expanding outward from an upper end of the cylindrical part and coupled to the detection unit; an expansion plate part formed on the cylindrical part and being in close contact with the rack housing unit; and a fastening part configured to couple the expansion plate part and the rack housing unit.

The rotary unit may include: a rotary worm gear part inserted into the casing unit and configured such that a part of the rotary worm gear part is exposed to the outside and engages with the rack drive unit; a rotary bearing part mounted in the casing unit and configured to support the rotary worm gear part so that the rotary worm gear part is rotatable; and a rotary extension part extending from the rotary worm gear part and connected to the detection unit.

The detection unit may include: a detection base part configured to cover the casing unit; a detection measurement part rotatably mounted on the detection base part and configured to detect a rotation of the rotary unit; a detection cover part configured to cover the detection measurement part; and a detection coupling part configured to couple the detection base part to the casing unit and couple the detection cover part to the detection base part.

The detection base part may include: a base plate portion being in surface contact with an upper portion of the casing unit; a base support portion extending from the base plate portion and configured to support the rotary unit; and a base through portion formed in the base plate portion and configured to allow the rotary unit to pass therethrough.

The detection base part may further include: a base insertion portion extending from the base plate portion and inserted into the casing unit; and a base sealing portion disposed between the base insertion portion and the casing unit and configured to prevent an inflow of foreign substances.

The detection base part may further include: a base groove portion formed at an edge of the base plate portion; and a base sealing member inserted into the base groove portion and being in close contact with the detection cover part and configured to prevent an inflow of foreign substances.

The detection measurement part may include: a first measurement member connected to the rotary unit and rotatable; one or more second measurement members rotatably mounted on the detection base part and configured to engage with the first measurement member and be rotatable; and a third measurement member configured to detect a rotation of one or more of the first and second measurement members.

According to the steering device for a vehicle according to the present disclosure, when the rack housing unit and the casing unit are assembled, the rack drive unit penetrating the rack housing unit may engage with the rotary unit embedded in the casing unit, and the detection unit assembled to the casing unit may measure the rotation of the rotary unit, which makes it possible to precisely detect the wheel steering state. In this case, the casing unit, the rack housing unit, and the detection unit may be manufactured by injection molding, which makes it possible to improve a degree of design freedom and assembly properties.

DETAILED DESCRIPTION OF THE ILLUSTRATED EMBODIMENTS

Hereinafter, a steering device for a vehicle according to the present disclosure will be described below with reference to the accompanying drawings through various exemplary embodiments. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, the definition of the terms should be made based on the entire contents of the present specification.

Figure 1:
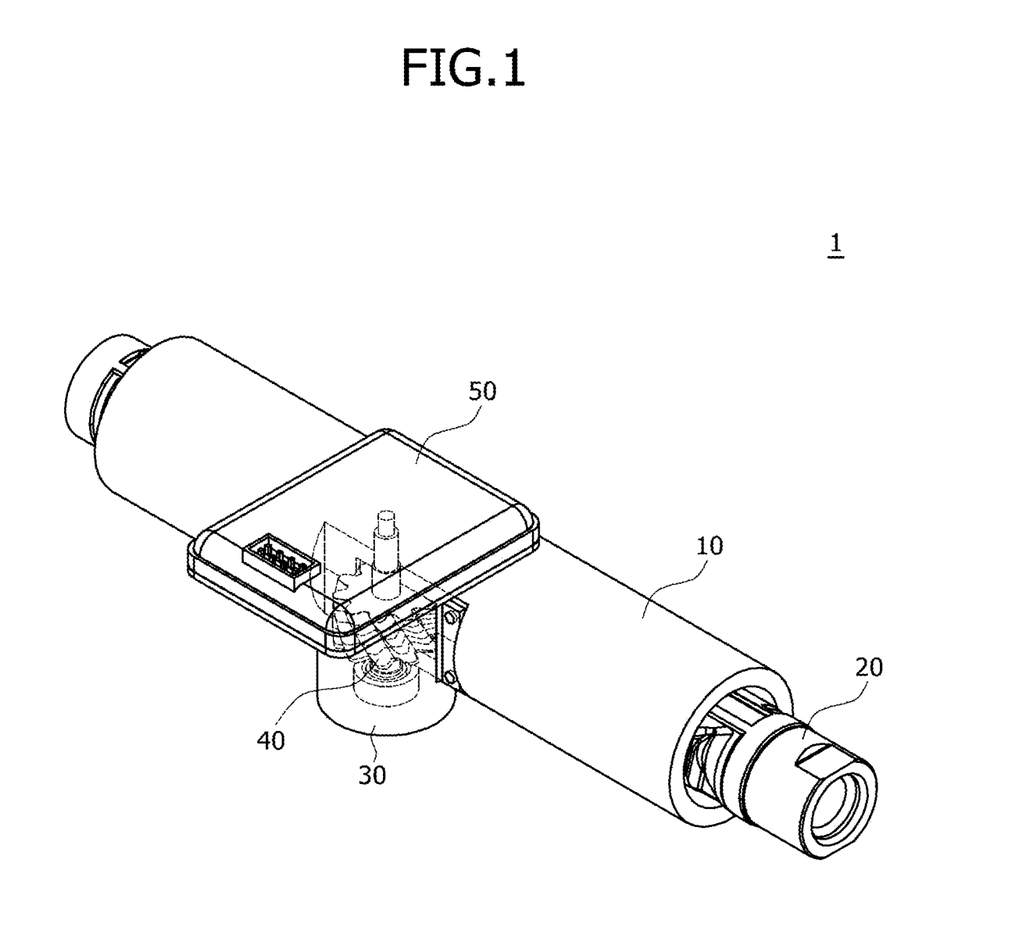
FIG. 1 is a view schematically illustrating a steering device for a vehicle according to an embodiment of the present disclosure.

FIG. 1 is a view schematically illustrating a steering device for a vehicle according to an embodiment of the present disclosure. Referring to FIG. 1, a steering device 1 for a vehicle according to an embodiment of the present disclosure includes a rack housing unit 10, a rack drive unit 20, a casing unit 30, a rotary unit 40, and a detection unit 50.

The rack housing unit 10 is disposed in a vehicle body. For example, the rack housing unit 10 may have a cylindrical shape and be fixedly installed in the vehicle body. The rack housing unit 10 may communicate with the casing unit 30.

The rack drive unit 20 is inserted into the rack housing unit 10 and movable in an axial direction. For example, the rack drive unit 20 may penetrate the rack housing unit 10 and change an angle of a wheel by being moved by a manipulation of a steering wheel disposed in a driver seat.

The casing unit 30 is coupled to the rack housing unit 10. For example, the casing unit 30 may be assembled to communicate with the rack housing unit 10.

The rotary unit 40 is mounted in the casing unit 30 and engages with the rack drive unit 20 so that the rotary unit 40 is rotatable. For example, the rotary unit 40 is rotatably mounted in the casing unit 10. A part of the rotary unit 40 may protrude from the casing unit 30 and engage with the rack drive unit 20. The rotary unit 40 and the rack drive unit 20 constitute a rack-pinion coupling structure that may convert a rectilinear motion into a rotational motion.

The detection unit 50 is mounted on the casing unit 10 and measures a rotation of the rotary unit 40. For example, the detection unit 50 may detect a rotation amount of the rotary unit 40 while rotating in conjunction with the rotary unit 40. The rotation amount of the rotary unit 40, which is measured by the detection unit 50, may be transmitted to a control unit, which makes it possible to precisely calculate a rotation angle of the wheel.

In this case, one or more of the rack housing unit 10, the casing unit 30, and the detection unit 50 are manufactured by injection molding. For example, the rack housing unit 10 and the casing unit 30 may be made of a resin material, a region of the detection unit 50, which corresponds to the housing, may be made of a resin material.

Figure 2:
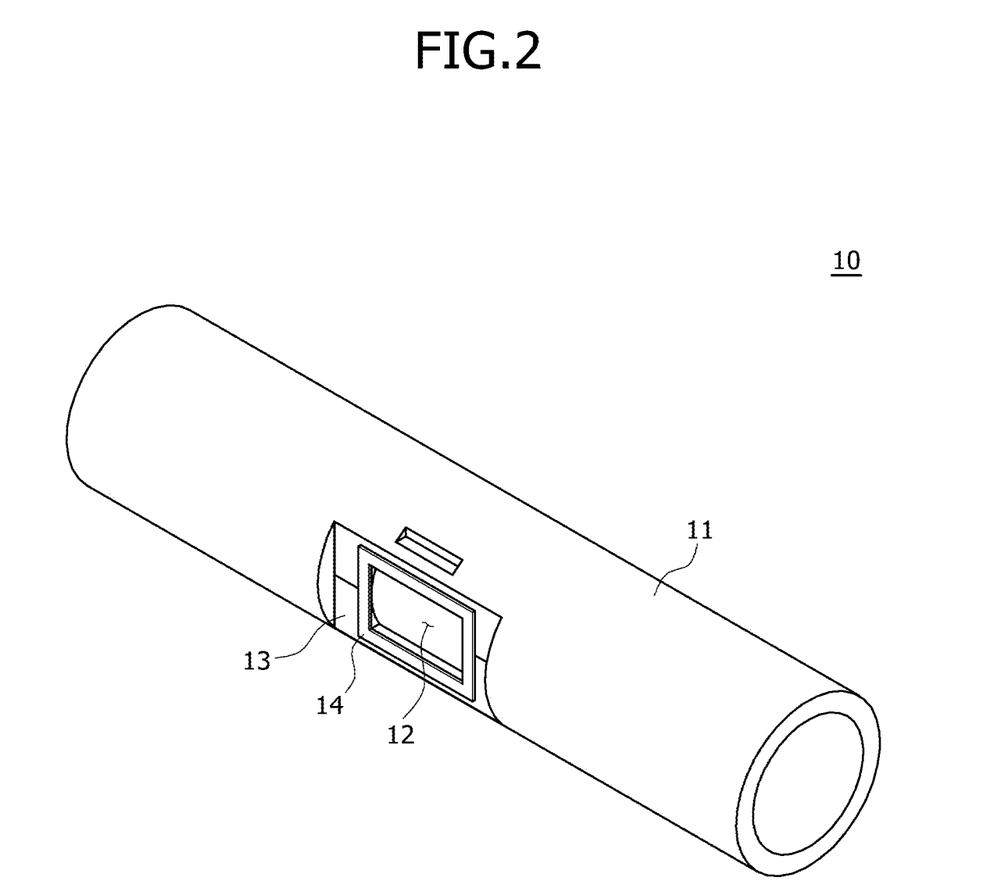
FIG. 2 is a view schematically illustrating a rack housing unit according to the embodiment of the present disclosure.

FIG. 2 is a view schematically illustrating the rack housing unit according to the embodiment of the present disclosure. Referring to FIG. 2, the rack housing unit 10 according to the embodiment of the present disclosure includes a rack housing body part 11, a rack housing hole part 12, a rack housing contact part 13.

The rack housing body part 11 may have a cylindrical shape so that the rack drive unit 20 may penetrate the rack housing body part 11. In addition, an outer portion of the rack drive unit 20 may have an angled shape and be fixed to the vehicle body by means of a separate fixed installation member.

The rack housing hole part 12 is formed in the rack housing body part 11 and guides the insertion of the rotary unit 40. For example, the rack housing hole part 12 may be a hole formed at one side of the rack housing body part 11.

The rack housing contact part 13 is formed in the rack housing body part 11 and disposed along a periphery of the rack housing hole part 12. The rack housing contact part 13 is configured to come into close contact with the casing unit 30. For example, the rack housing contact part 13 may define a region that surrounds the rack housing hole part 12. The rack housing contact part 13 may have a groove shape recessed from an outer peripheral surface of the rack housing body part 11.

The rack housing unit 10 according to the embodiment of the present disclosure may further include a rack housing sealing part 14. The rack housing sealing part 14 is disposed between the rack housing body part 11 and the casing unit 30 and prevents an inflow of foreign substances. For example, the rack housing sealing part 14 may have a rubber ring shape and be disposed to surround the rack housing hole part 12. In addition, the rack housing sealing part 14 may be silicone applied between the rack housing body part 11 and the casing unit 30 or a gasket disposed between the rack housing body part 11 and the casing unit 30 so as to be in surface contact with the rack housing body part 11 and the casing unit 30.

Figure 3:
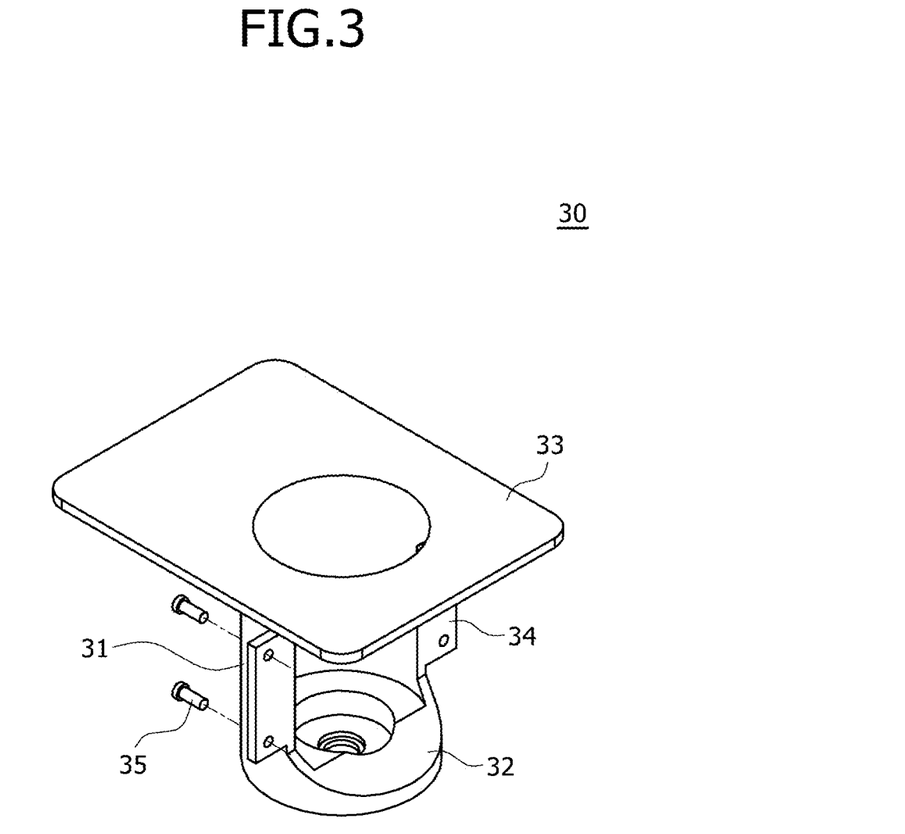
FIG. 3 is a view schematically illustrating a casing unit according to the embodiment of the present disclosure.

FIG. 3 is a view schematically illustrating the casing unit according to the embodiment of the present disclosure. Referring to FIG. 3, the casing unit 30 according to the embodiment of the present disclosure includes a cylindrical part 31, a lower support part 32, an upper support part 33, expansion plate parts 34, and a fastening part 35.

The cylindrical part 31 has a shape having an opening at one side thereof so that the rotary unit 40 is exposed. For example, the rotary unit 40 may be inserted into the cylindrical part 31. A part of an outer peripheral surface of the cylindrical part 31 is cut out, such that an opened region of the cylindrical part 31 may correspond to the rack housing hole part 12.

The lower support part 32 covers a lower end of the cylindrical part 31 and supports the rotary unit 40. For example, the lower support part 32 may be integrated with the cylindrical part 31 and have a groove into which a part of the rotary unit 40 may be inserted.

The upper support part 33 expands outward from an upper end of the cylindrical part 31 and is coupled to the detection unit 50. For example, the upper support part 33 may be integrated with the cylindrical part 31, and an upper surface of the upper support part 33 may be in surface contact with the detection unit 50.

The expansion plate parts 34 are formed on the cylindrical part 31 and configured to come into close contact with the rack housing unit 10. For example, the expansion plate parts 34 may respectively extend from two opposite sides of the opened region of the cylindrical part 31 and be in surface contact with the rack housing contact part 13.

The fastening parts 35 couple the expansion plate parts 34 to the rack housing unit 10. For example, the expansion plate parts 34 and the rack housing contact part 13 may be assembled in a screw fastening manner by the fastening parts 35.

Figure 4:
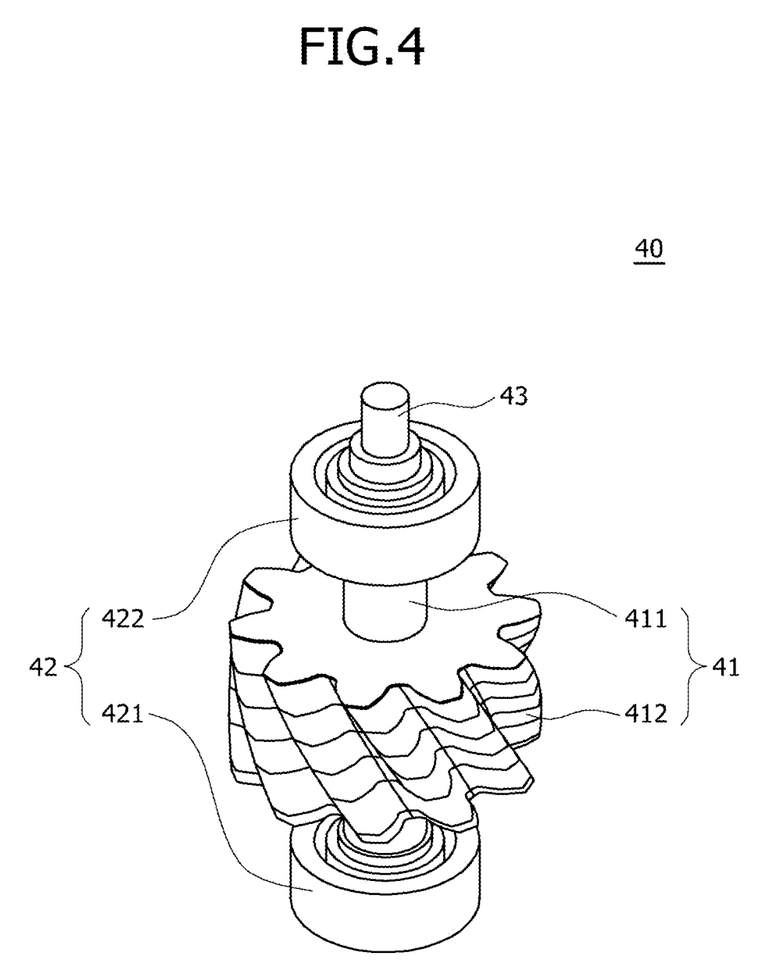
FIG. 4 is a view schematically illustrating a rotary unit according to the embodiment of the present disclosure.

FIG. 4 is a view schematically illustrating the rotary unit according to the embodiment of the present disclosure. Referring to FIG. 4, the rotary unit 40 according to the embodiment of the present disclosure includes a rotary worm gear part 41, rotary bearing parts 42, and a rotary extension part 43.

The rotary worm gear part 41 is inserted into the casing unit 30, and a part of the rotary worm gear part 41 is exposed to the outside and engages with the rack drive unit 20. For example, the rotary worm gear part 41 may include a rotary shaft 411 inserted into the cylindrical part 31, and a worm gear 412 formed on the rotary shaft 411 and configured to engage with the rack drive unit 20 to transmit the power.

The rotary bearing parts 42 are mounted in the casing unit 30 and support the rotary worm gear part 41 so that the rotary worm gear part 41 is rotatable. For example, the rotary bearing parts 42 may include a lower bearing part 421 and an upper bearing part 422. The lower bearing part 421 may be mounted on the lower support part 32 and support a lower end of the rotary shaft 411 so that the rotary shaft 411 is rotatable. The upper bearing part 422 may be mounted on the detection unit 50 and support an upper end of the rotary shaft 411 so that the rotary shaft 411 is rotatable.

The rotary extension part 43 extends from the rotary worm gear part 41 and is connected to the detection unit 50. For example, the rotary extension part 43 may extend from the rotary shaft 411 and transmit a rotational force.

Figure 5:
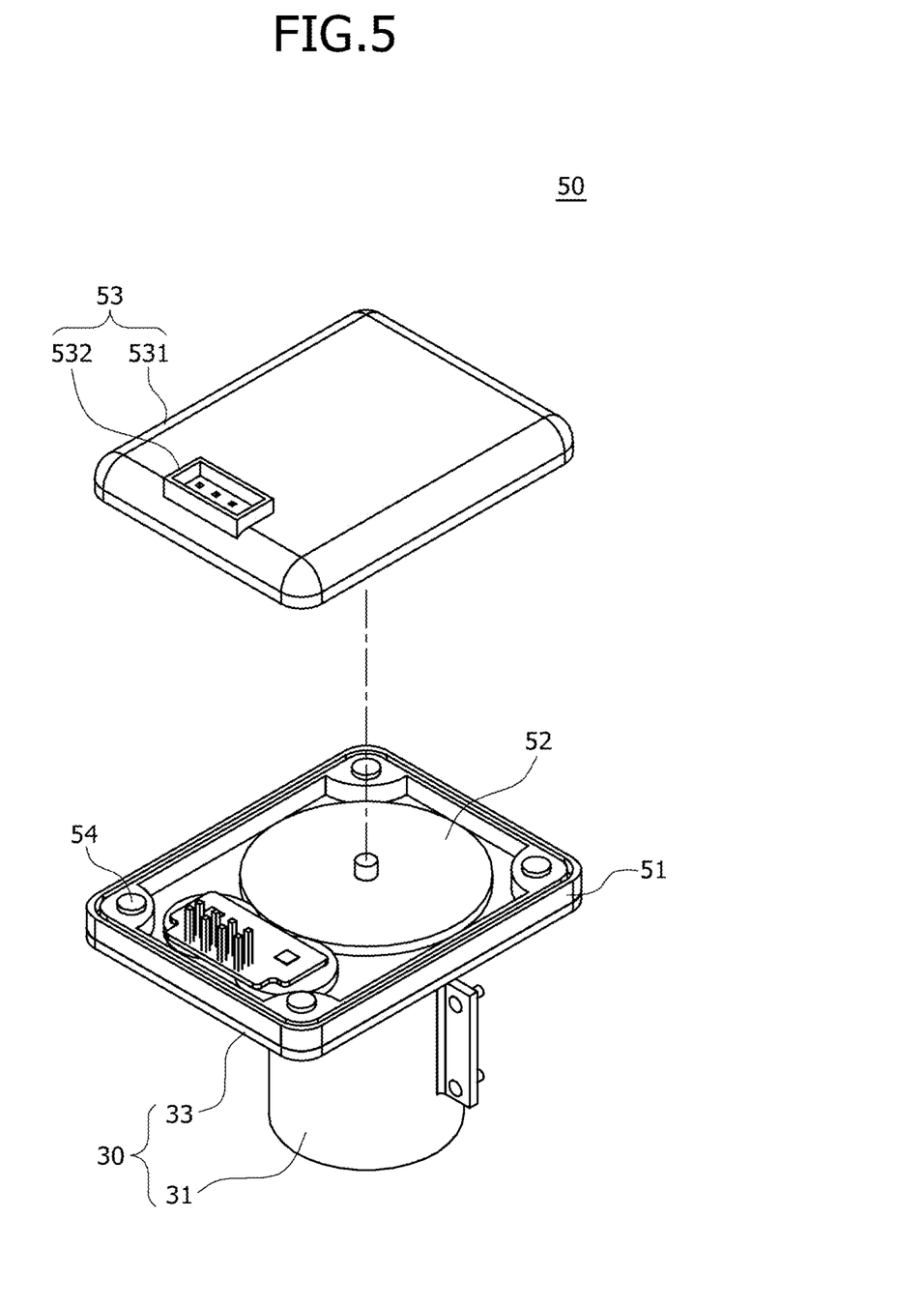
FIG. 5 is a view schematically illustrating a detection unit according to the embodiment of the present disclosure.

FIG. 5 is a view schematically illustrating the detection unit according to the embodiment of the present disclosure. Referring to FIG. 5, the detection unit 50 according to the embodiment of the present disclosure includes a detection base part 51, a detection measurement part 52, a detection cover part 53, and detection coupling parts 54. In this case, the detection base part 51 and the detection cover part 53 may be manufactured by injection molding.

The detection base part 51 covers the casing unit 30. For example, the detection base part 51 may cover the opened region at an upper end of the cylindrical part 31 and be in surface contact with the upper support part 33.

The detection measurement part 52 is rotatably mounted on the detection base part 51 and detects a rotation of the rotary unit 40. For example, the detection measurement part 52 may be connected directly to the rotary extension part 43 and measure a rotation angle of the rotary unit 40 while rotating.

The detection cover part 53 covers the detection measurement part 52. For example, the detection cover part 53 may be in surface contact with an edge of the detection base part 51. The detection cover part 53 may include a cover body portion 531 configured to cover the detection measurement part 52, and a cover connection portion 532 formed on the cover body portion 531 and configured to guide terminal connection.

The detection coupling parts 54 couple the detection base part 51 to the casing unit 30 and couple the detection cover part 53 to the detection base part 51. For example, the detection coupling parts 54 may be fixed by being caught by the detection cover part 53. The detection coupling parts 54 may penetrate the detection base part 51 and be coupled to the upper support part 33 by screws or bolts. In addition, the detection coupling parts 54 may couple the detection base part 51 and the upper support part 33 and couple the detection base part 51 and the detection cover part 53. In this case, the method of coupling these components may be the hook engagement instead of the screw engagement, and various coupling methods capable of assembling these components may be applied.

Figure 6:
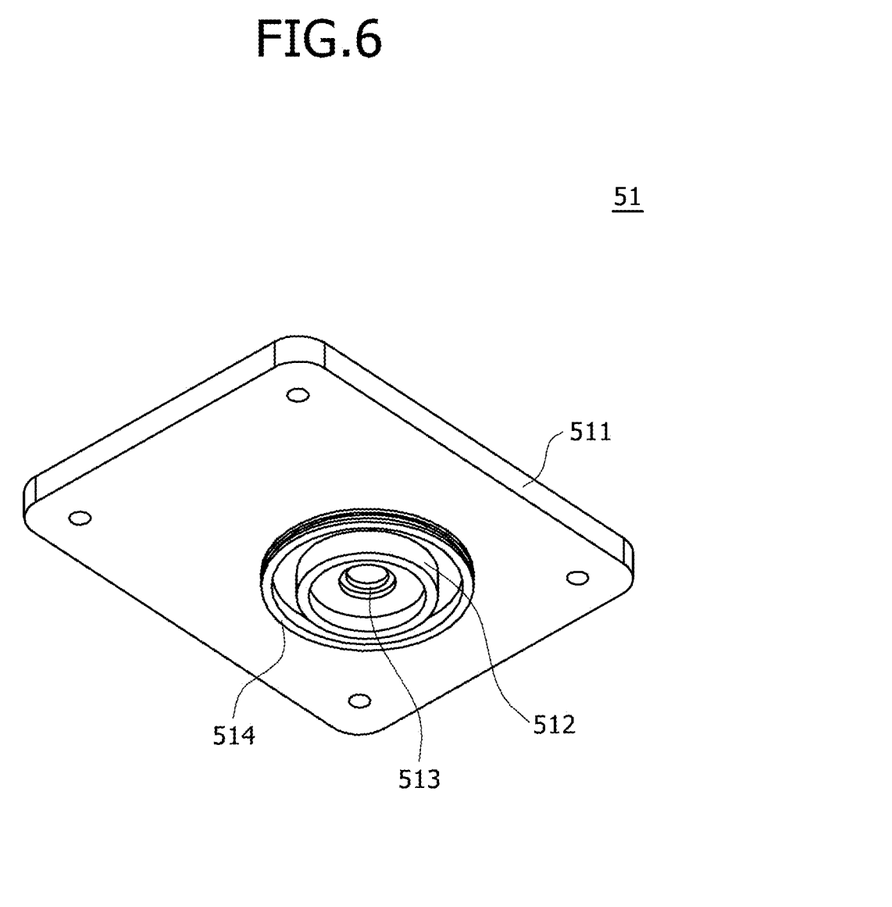
FIG. 6 is a perspective view schematically illustrating a lower portion of a detection base part according to the embodiment of the present disclosure.
Figure 7:
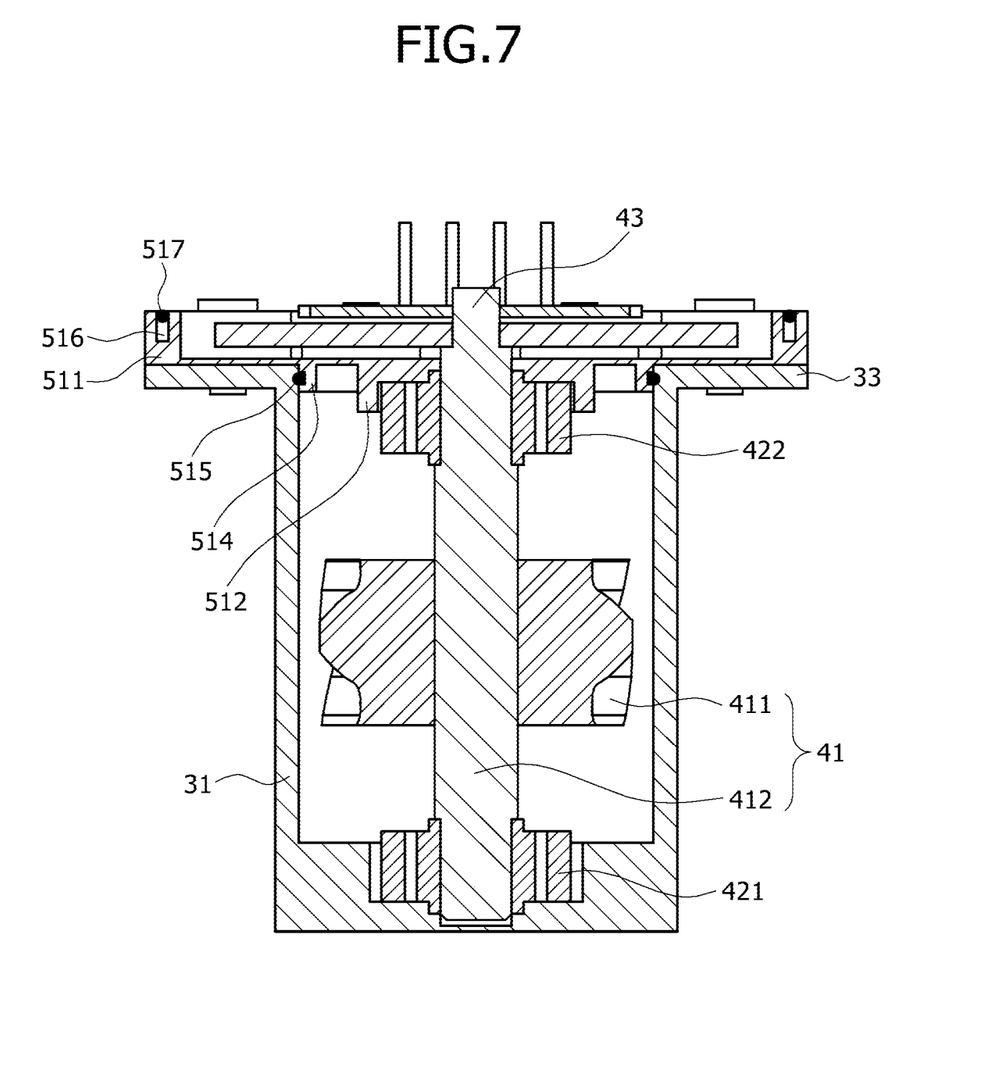
FIG. 7 is a cross-sectional view schematically illustrating the detection base part according to the embodiment of the present disclosure.

FIG. 6 is a perspective view schematically illustrating a lower portion of the detection base part according to the embodiment of the present disclosure, and FIG. 7 is a cross-sectional view schematically illustrating the detection base part according to the embodiment of the present disclosure. Referring to FIGS. 6 and 7, the detection base part 51 according to the embodiment of the present disclosure includes a base plate portion 511, a base support portion 512, and a base through portion 513.

The base plate portion 511 is in surface contact with an upper portion of the casing unit 30. For example, the base plate portion 511 may have a shape corresponding to a shape of the upper support part 33. The base plate portion 511 may be in surface contact with the upper support part 33 and cover the opened region of the cylindrical part 31.

The base support portion 512 extends from the base plate portion 511 and supports the rotary unit 40. For example, the base support portion 512 may protrude from a bottom surface of the base plate portion 511 and have a circular band shape. The upper bearing part 422 may be inserted into the base support portion 512.

The base through portion 513 is formed in the base plate portion 511 and allows the rotary unit 40 to pass therethrough. For example, the base through portion 513 may be formed at a center of the base support portion 512 and have a hole shape that allows the rotary extension part 43 to pass therethrough.

The detection base part 51 according to the embodiment of the present disclosure may further include a base insertion portion 514 and a base sealing portion 515.

The base insertion portion 514 extends from the base plate portion 511 and is inserted into the casing unit 30. For example, the base insertion portion 514 may protrude from the bottom surface of the base plate portion 511 and have a circular band shape. An inner diameter of the base insertion portion 514 may be designed to be larger than an outer diameter of the base support portion 512. An outer peripheral surface of the base insertion portion 514 may be in close contact with an inner peripheral surface of the cylindrical part 31.

The base sealing portion 515 is disposed between the base insertion portion 514 and the casing unit 30 and prevents an inflow of foreign substances. For example, the base sealing portion 515 may be inserted into a groove formed along the outer peripheral surface of the base insertion portion 514 and be in close contact with the inner peripheral surface of the cylindrical part 31.

The detection base part 51 according to the embodiment of the present disclosure may further include a base groove portion 516 and a base sealing member 517.

The base groove portion 516 is formed at an edge of the base plate portion 511. For example, the base groove portion 516 may be a groove having a band shape and formed along an edge of an upper surface of the base plate portion 511.

The base sealing member 517 is inserted into the base groove portion 516 and in close contact with the detection cover part 53 to prevent an inflow of foreign substances. For example, the base sealing member 517 may be an O-ring made of rubber and come into contact with a bottom surface of the detection cover part 53.

Figure 8:
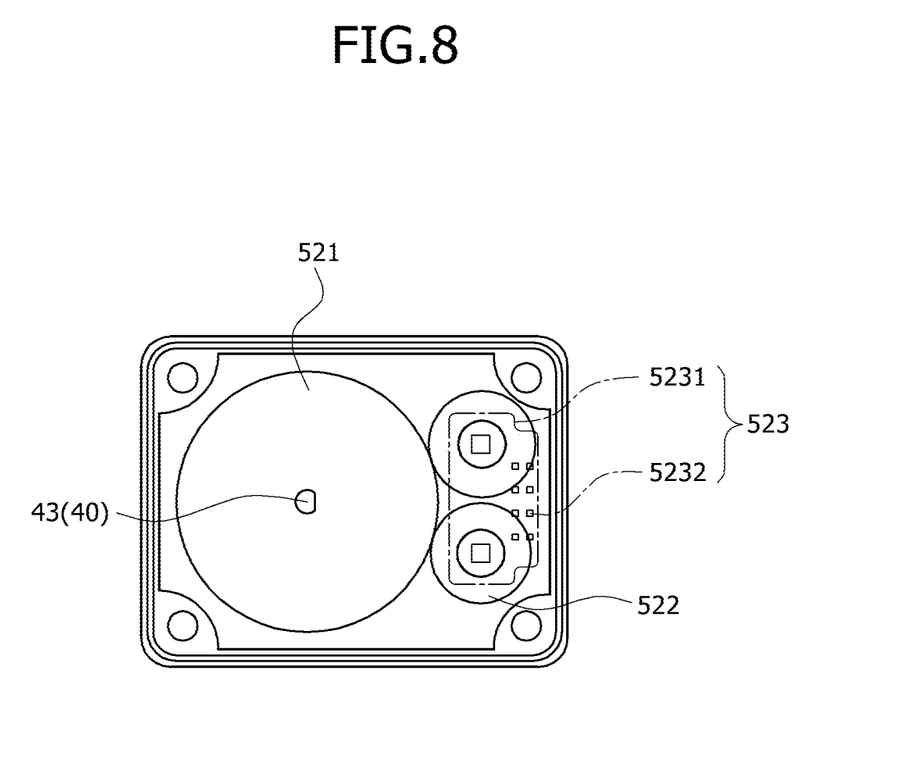
FIG. 8 is a view schematically illustrating a detection measurement part according to the embodiment of the present disclosure.

FIG. 8 is a view schematically illustrating the detection measurement part according to the embodiment of the present disclosure. Referring to FIG. 8, the detection measurement part 52 according to the embodiment of the present disclosure may include a first measurement member 521, a second measurement member 522, and a third measurement member 523.

The first measurement member 521 is connected to the rotary unit 40, such that the first measurement member 521 is rotatable. For example, the rotary extension part 43 penetrates a central axis of the first measurement member 521, and the rotary extension part 43 has an angled shape, such that the rotary extension part 43 and the first measurement member 521 may operate in conjunction with each other.

The second measurement member 522 is rotatably mounted on the detection base part 51 and engages with the first measurement member 521, such that the second measurement member 522 is rotatable. One or more second measurement members 522 may be disposed. In a case in which two second measurement members 522 are disposed, both the two second measurement members 522 may engage with the first measurement member 521. In addition, in a case in which only one of the two second measurement members 522 engages with the first measurement member 521, the two second measurement members 522 may engage with each other.

The third measurement member 523 detects a rotation of one or more of the first and second measurement members 521 and 522. For example, the third measurement member 523 may include: a second measurement board 5231 disposed above the second measurement members 522 and configured to support the rotations of the second measurement members 522 and measure a change in quantity of magnetism according to the rotations of the second measurement members 522; and a second measurement terminal 5232 configured to transmit a value measured by the second measurement board 5231. In this case, the second measurement terminal 5232 may penetrate the cover connection portion 532 and be connected to the control unit.

A process of assembling and operating the steering device for a vehicle according to the embodiment of the present disclosure having the above-mentioned structure will be described below.

The rotary unit 40 is mounted in the cylindrical part 31, and the detection base part 51 is seated on the upper support part 33. In this case, when the rotary extension part 43 formed at an upper end of the rotary unit 40 penetrates the detection base part 51, the rotary extension part 43 and the first measurement member 521 are coupled to each other.

The second measurement member 522 configured to engage with the first measurement member 521 is installed on the detection base part 51, and the third measurement member 523 configured to measure and transmit the rotation amounts of the first and second measurement members 521 and 522 is installed on the detection base part 51. Thereafter, the detection base part 51 is covered by the detection cover part 53, and the detection unit 50 is coupled to the upper support part 33 by the detection coupling part 54.

When the casing unit 30 and the detection unit 50 are completely assembled, the casing unit 30 and the rack housing unit 10 penetrated by the rack drive unit 20 are assembled. In this case, the rotary unit 40 engages with the rack drive unit 20.

In the above-mentioned assembly process, the detection unit 50 and the casing unit 30 mounted with the rotary unit 40 may be modularized, and the rack housing unit 10 and the casing unit 30 assembled with the detection unit 50 are coupled to make a product.

Meanwhile, when vehicle steering is required in a state in which the assembly process is completed as described above, the rack drive unit 20 rectilinearly moves. In this case, when the rotary unit 40 engaging with the rack drive unit 20 rotates, the first measurement member 521 connected to the rotary unit 40 rotates, and the second measurement member 522 engaging with the first measurement member 521 rotates.

When the second measurement member 522 rotates, the third measurement member 523 may measure and transmit the rotation value of the second measurement member 522, thereby precisely detecting a wheel steering angle.

According to the steering device 1 for a vehicle according to the embodiment of the present disclosure, when the rack housing unit 10 and the casing unit 30 are assembled, the rack drive unit 20 penetrating the rack housing unit 10 may engage with the rotary unit 40 embedded in the casing unit 30, and the detection unit 50 assembled to the casing unit 30 may measure the rotation of the rotary unit 40, which makes it possible to precisely detect the wheel steering state. In this case, the casing unit 30, the rack housing unit 10, and the detection unit 50 are manufactured by injection molding, which makes it possible to improve a degree of design freedom and assembly properties.

While the present disclosure has been described with reference to the exemplary embodiment depicted in the drawings, the exemplary embodiment is described just for illustration, and those skilled in the art to the present technology pertains will understand that various modifications of the exemplary embodiment and any other exemplary embodiment equivalent thereto are available. Accordingly, the true technical protection scope of the present disclosure should be determined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering device for a vehicle, the steering device comprising:
   a rack housing unit;
   a rack drive unit inserted into the rack housing unit and configured to be movable in an axial direction;
   a casing unit coupled to the rack housing unit;
   a rotary unit mounted in the casing unit and configured to engage with the rack drive unit and be rotatable; and
   a detection unit mounted on the casing unit and configured to measure a rotation of the rotary unit,
   wherein the detection unit comprises:
      a detection base part configured to cover the casing unit;
      a detection measurement part rotatably mounted on the detection base part and configured to detect a rotation of the rotary unit;
      a detection cover part configured to cover the detection measurement part; and
      a detection coupling part configured to couple the detection base part to the casing unit and couple the detection cover part to the detection base part.

2. The steering device of claim 1, wherein one or more of the rack housing unit, casing unit, and detection unit are manufactured by injection molding.

3. The steering device of claim 1, wherein the rack housing unit comprises:
   a rack housing body part penetrated by the rack drive unit;
   a rack housing hole part formed in the rack housing body part and being configured to guide insertion of the rotary unit; and
   a rack housing contact part formed in the rack housing body part, disposed along a periphery of the rack housing hole part, and being in contact with the casing unit.

4. The steering device of claim 3, wherein the rack housing unit further comprises a rack housing sealing part disposed between the rack housing body part and the casing unit and configured to prevent an inflow of foreign substances.

5. The steering device of claim 1, wherein the casing unit comprises:
   a cylindrical part having an opening at one side thereof and configured to expose the rotary unit;
   a lower support part configured to cover a lower end of the cylindrical part and support the rotary unit;
   an upper support part expanding outward from an upper end of the cylindrical part and coupled to the detection unit;
   an expansion plate part formed on the cylindrical part and being in contact with the rack housing unit; and
   a fastening part configured to couple the expansion plate part and the rack housing unit.

6. The steering device of claim 1, wherein the rotary unit comprises:
   a rotary worm gear part inserted into the casing unit and configured such that a part of the rotary worm gear part is exposed and engages with the rack drive unit;
   a rotary bearing part mounted in the casing unit and configured to support the rotary worm gear part such that the rotary worm gear part is rotatable; and
   a rotary extension part extending from the rotary worm gear part and connected to the detection unit.

7. The steering device of claim 1, wherein the detection base part comprises:
   a base plate portion being in contact with an upper portion of the casing unit;
   a base support portion extending from the base plate portion and configured to support the rotary unit; and
   a base through portion formed in the base plate portion and configured to allow the rotary unit to pass therethrough.

8. The steering device of claim 7, wherein the detection base part further comprises:
   a base insertion portion extending from the base plate portion and being inserted into the casing unit; and
   a base sealing portion disposed between the base insertion portion and the casing unit and configured to prevent an inflow of foreign substances.

9. The steering device of claim 7, wherein the detection base part further comprises:
   a base groove portion formed at an edge of the base plate portion; and
   a base sealing member inserted into the base groove portion and being in contact with the detection cover part, and configured to prevent an inflow of foreign substances.

10. The steering device of claim 1, wherein the detection measurement part comprises:
    a first measurement member connected to the rotary unit and being rotatable;
    one or more second measurement members rotatably mounted on the detection base part and configured to engage with the first measurement member and be rotatable; and
    a third measurement member configured to detect a rotation of one or more of the first and second measurement members.

* * * * *